(12) United States Patent
Takeuchi

(10) Patent No.: US 9,678,592 B2
(45) Date of Patent: Jun. 13, 2017

(54) INPUT DEVICE FOR A VISUAL DISPLAY THAT GENERATES ULTRASONIC TACTILE FEEDBACK

(71) Applicant: KABUSHIKI KAISHA TOKAI RIKA DENKI SEISAKUSHO, Aichi (JP)

(72) Inventor: Shuichi Takeuchi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 125 days.

(21) Appl. No.: 14/548,347

(22) Filed: Nov. 20, 2014

(65) Prior Publication Data

US 2015/0160771 A1 Jun. 11, 2015

(30) Foreign Application Priority Data

Dec. 11, 2013 (JP) .................................. 2013-255996

(51) Int. Cl.
*G06F 3/041* (2006.01)
*G06F 3/01* (2006.01)

(52) U.S. Cl.
CPC ............ *G06F 3/0414* (2013.01); *G06F 3/016* (2013.01); *G06F 3/041* (2013.01)

(58) Field of Classification Search
CPC ......... G06F 3/0414; G06F 3/041; G06F 3/016
See application file for complete search history.

(56) References Cited

U.S. PATENT DOCUMENTS

2007/0236450 A1* 10/2007 Colgate .................. G06F 3/016
345/156
2010/0231368 A1* 9/2010 Nakayama ............... B60Q 5/00
340/425.5

(Continued)

FOREIGN PATENT DOCUMENTS

| JP | 2006-107140 A | 4/2006 |
| JP | 2010-146576 | 7/2010 |
| JP | 2010-231609 A | 10/2010 |

OTHER PUBLICATIONS

Office Action issued in the corresponding Japanese Application No. 2013-255996 on Feb. 22, 2017.

*Primary Examiner* — Ryan A Lubit
(74) *Attorney, Agent, or Firm* — Roberts Mlotkowski Safran Cole & Calderon P.C.

(57) ABSTRACT

An input device includes a display to display an operation object on a display screen, a touch sensor to output an operation signal based on a touch location on an operation surface, a force sensor to detect a pressing force to the operation surface and output a detection signal, a vibrator to vibrate the operation surface based on a vibration control signal, and a controller to output the vibration control signal such that the vibrator vibrates at a frequency in a predetermined range when the touch location is within a region corresponding to the operation object and when the pressing force detected is not less than a predetermined value, and the vibrator vibrates with a waveform obtained by amplitude-modulating a waveform at a frequency in an ultrasonic range by a modulation wave at a frequency in a predetermined range when the pressing force detected is smaller than the predetermined value.

7 Claims, 3 Drawing Sheets

(56) References Cited

U.S. PATENT DOCUMENTS

| | | | | |
|---|---|---|---|---|
| 2012/0256848 | A1* | 10/2012 | Madabusi | G06F 1/1626 345/173 |
| 2013/0113715 | A1* | 5/2013 | Grant | G06F 3/0488 345/173 |
| 2014/0098038 | A1* | 4/2014 | Paek | G06F 1/1692 345/173 |
| 2014/0101545 | A1* | 4/2014 | Paek | G06F 3/016 715/702 |
| 2014/0125467 | A1* | 5/2014 | Da Costa | G08B 6/00 340/407.1 |
| 2014/0139450 | A1* | 5/2014 | Levesque | G08B 6/00 345/173 |
| 2014/0362014 | A1* | 12/2014 | Ullrich | G06F 3/016 345/173 |
| 2015/0042573 | A1* | 2/2015 | Grant | G06F 3/016 345/173 |
| 2015/0070265 | A1* | 3/2015 | Cruz-Hernandez | G10L 21/06 345/156 |
| 2015/0145657 | A1* | 5/2015 | Levesque | G06F 3/016 340/407.2 |

* cited by examiner $F=F_1(\geq F_{TH})$ $W_N$ VIBRATION $F=F_2(<F_{TH})$ $W_F$  $W_{US}$ ULTRASONIC VIBRATION a  b

INPUT DEVICE FOR A VISUAL DISPLAY THAT GENERATES ULTRASONIC TACTILE FEEDBACK

The present application is based on Japanese patent application No.2013-255996 filed on Dec. 11, 2013, the entire contents of which are incorporated herein by reference.

BACKGROUND OF THE INVENTION

1. Field of the Invention

The invention relates to an input device used to control the operation of an in-vehicle device such as an air conditioner, an audio device and a navigation system.

2. Description of the Related Art

An input device is known which presents a vibration to a user upon pressing an operation surface thereof such that the vibration varies according to a pressing force which the user applies to the operation surface (see e.g. JP-A-2010-146576).

The input device is provided with a sensor for detecting the pressing force of the user to the operation surface, a controller for outputting a control signal corresponding to the pressing force detected by the sensor, a piezoelectric element for generating vibration on the operation surface based on a drive signal and a drive means for generating a drive signal according to the pressing force. The intensity of vibration varies so as to inform the user of which level of the pressing force is inputted upon the pressing of the operation surface.

SUMMARY OF THE INVENTION

The input device disclosed in JP-A-2010-146576 may cause a problem that it is sometimes difficult to transmit the vibration to the user when the user performs a tracing operation on the operation surface since the pressing force against the operation surface sometimes becomes small. Also, another problem may arise that, when the intensity of vibration increases so as to sufficiently transmit the vibration to the user, noise generated along with the vibration of the operation surface makes the user uncomfortable during the operation.

It is an object of the invention to provide an input device that prevents a noise generated along with the vibration and provides the user with a steady operational feeling however the user operates it.

(1) According to one embodiment of the invention, an input device comprises:

a display to display an operation object on a display screen;

a touch sensor to output an operation signal based on a touch location on an operation surface corresponding to the display screen of the display;

a force sensor to detect a pressing force to the operation surface and output a detection signal;

a vibrator to vibrate the operation surface based on a vibration control signal; and a controller to receive the operation signal and output the vibration control signal such that the vibrator vibrates at a frequency in a predetermined range when the touch location is within a region corresponding to the operation object on the display screen and when the pressing force detected is not less than a predetermined value, and that the vibrator vibrates with a waveform obtained by amplitude-modulating a waveform at a frequency in an ultrasonic range by a modulation wave at a frequency in a predetermined range when the pressing force detected is smaller than the predetermined value.

In the above embodiment (1) of the invention, the following modifications and changes can be made.

(i) The controller outputs the vibration control signal such that the vibrator vibrates with the waveform obtained by amplitude-modulating the waveform at the frequency in the ultrasonic range by the modulation wave at the frequency in the predetermined range less than the frequency in the ultrasonic range when the pressing force pressing the operation surface of the touch sensor is smaller than the predetermined value.

(ii) The controller outputs the vibration control signal such that the vibrator vibrates with the waveform amplitude-modulated so as to periodically change a friction resistance between a finger of a user and the operation surface when the pressing force pressing the operation surface of the touch sensor is smaller than the predetermined value.

(iii) The vibrator stops vibrating when the touch location is out of the region corresponding to the operation object on the display screen.

(iv) The vibrator is disposed at a center of the operation surface.

(v) The force sensor is disposed at a corner of the operation surface.

(vi) The vibrator is integrated with the force sensor.

Advantageous Effects Of The Invention

According to one embodiment of the invention, an input device can be provided that prevents a noise generated along with the vibration and provides the user with a steady operational feeling however the user operates it.

BRIEF DESCRIPTION OF THE DRAWINGS

Next, the present invention will be explained in more detail in conjunction with appended drawings, wherein.

DETAILED DESCRIPTION OF THE PREFERRED EMBODIMENT

Configuration of Input Device

Figure 1A:
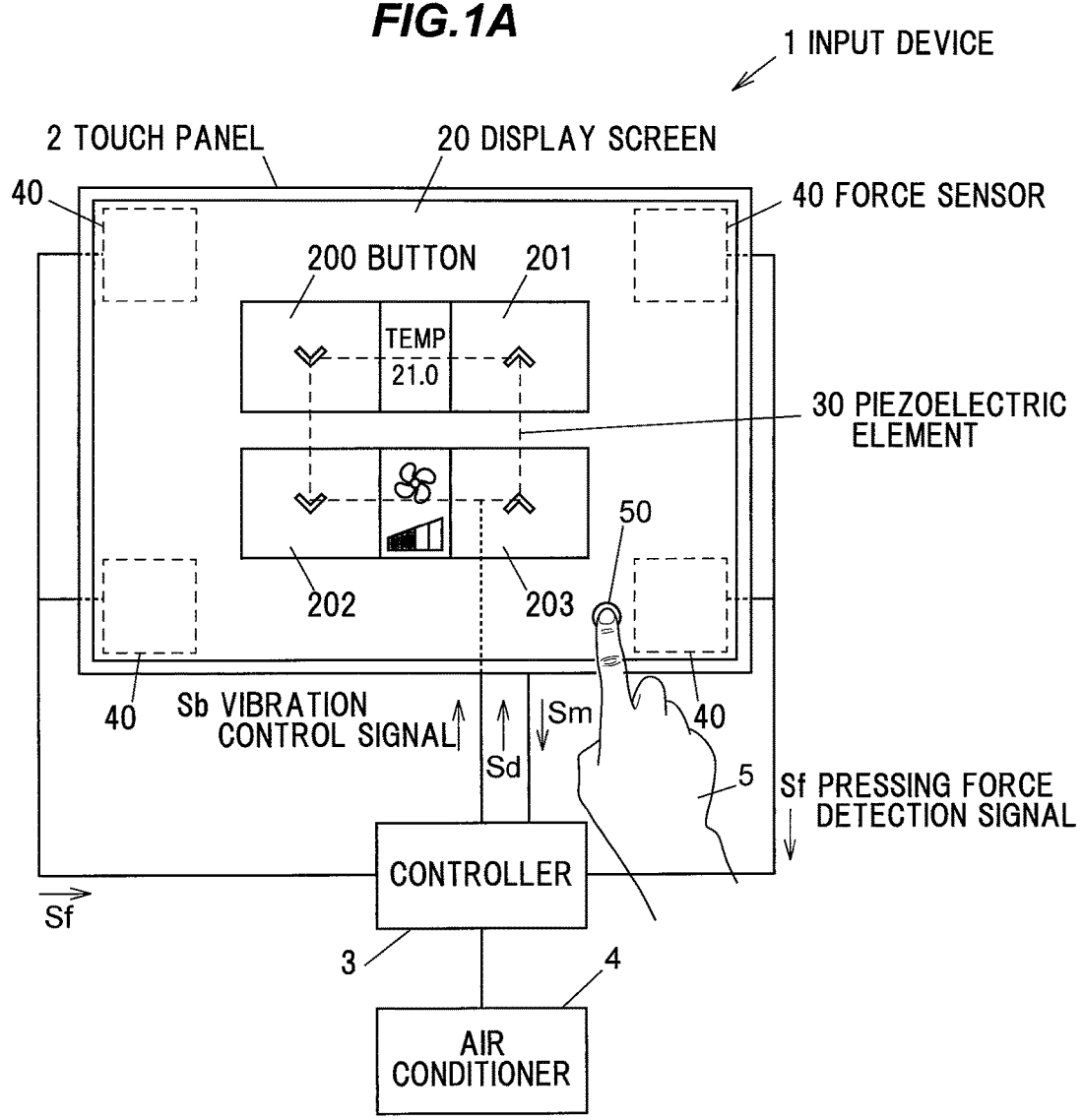
FIGS. 1A and 1B are schematic views showing a configuration example of an input device.
Figure 1B:
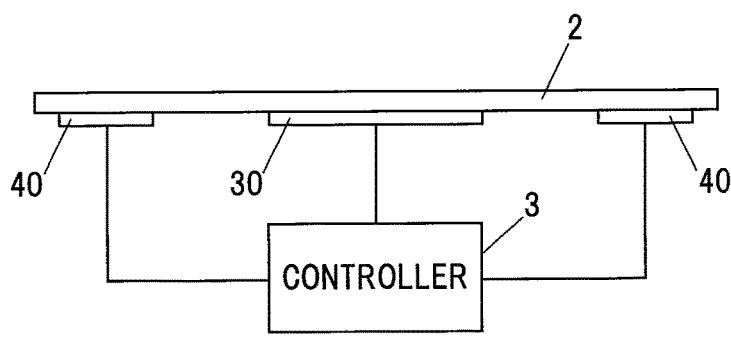

FIGS. 1A and 1B are schematic views showing a configuration example of an input device.

In FIG. 1A, a typical input device in the embodiment is generally indicated by the reference numeral 1 and is schematically illustrated. The input device 1 is used for, but not specifically limited to, controlling an operation of, e.g., an in-vehicle device which is an air conditioner 4 here, and may be used for controlling an operation of an audio device or a navigation system, etc.

The input device 1 has a controller 3 for controlling an operation of the air conditioner 4, a touch panel 2 provided with a display as a display means for displaying a control screen, etc., of the air conditioner 4 and a touch sensor as an input means formed of a transparent or semi-transparent material so as not to block the image on the display and provided on the display to output an operation signal Sm in accordance with a touch operation on an operation surface, a piezoelectric element 30 as an example of vibrator provided on the back side of the touch panel 2 as shown in FIG. 1B to apply vibration to the touch panel 2, and force sensors 40 provided on the back side of the touch panel 2 to detect a pressing force applied to the operation surface of the touch panel 2 and then to output a pressing force detection signal Sf The controller 3, which operates based on the operation signal Sm output from the touch panel 2, controls images displayed on the touch panel 2 by a display control signal Sd and also controls the piezoelectric element 30 by a vibration control signal Sb.

The input device 1 in the illustrated example is arranged so that, e.g., the touch panel 2 is located on a dash panel or around a driver's seat such as on a center console. The input device 1 is configured so that, when the touch panel 2 is touch-operated by a finger 5 of a user, a position of, e.g., a touch location 50 on a surface of the touch panel 2 is detected by the touch sensor, the operation signal Sm corresponding to the detected position is input to the controller 3 to select one of buttons 200 to 203 on the touch panel 2 and the controller 3 controls the air conditioner 4 according to the selection.

In the touch panel 2, a control screen of the air conditioner 4 including the plural buttons 200 to 203 as operation objects is displayed on a display screen 20. The arrangement of the buttons 200 to 203 is not specifically limited to that shown in the drawing.

As an example, the buttons 200 and 201 on the display screen 20 have functions of turning up and down the temperature and the buttons 202 and 203 have functions of increasing and decreasing the air volume. The touch panel 2 may alternatively display a control screen of a navigation system, or may display control screens of plural in-vehicle devices on the same screen.

The coordinates of an indicated position in the display screen 20 of the touch panel 2 and the coordinates of the touch location 50 on the touchpad of the touch panel 2 are in an absolute coordinate system in a one-to-one correspondence manner. Alternatively, the display and the touch sensor of the touch panel 2 may be provided separately.

The piezoelectric element 30 can be formed of a piezoelectric material, such as piezoelectric ceramics, piezoelectric polymer membrane or piezoelectric film, is a vibrator generating ultrasonic vibration by application of AC voltage between electrodes, vibrates based on the vibration control signal Sb from the controller 3 when the controller 3 determines that the touch location 50 is within an area of the button 200 to 203 (a vibration producing area), and is controlled to stop vibration when it is determined that the touch location 50 is out of the area of the button 200 to 203. Alternatively, a vibrator which can change resonant frequency to generate vibration frequencies of plural values may be used, or plural vibrators with different resonant frequencies may be prepared.

Here, the vibration produced by the piezoelectric element 30 is to show that the finger 5 of the user is touching the button 200 to 203. When a pressing force of the finger 5 of the user pressing the operation surface of the touch panel 2 is not less than a predetermined value, the piezoelectric element 30 vibrates at a frequency in a predetermined range based on the vibration control signal Sb input from the controller 3. Meanwhile, when the pressing force of the finger 5 of the user pressing the operation surface of the touch panel 2 is smaller than the predetermined value, the piezoelectric element 30 vibrates with a waveform resulting from amplitude modulation of modulating a waveform at a frequency in an ultrasonic range by a modulation wave at a frequency in a predetermined range.

The force sensor (or pressure sensor) 40, which can be formed of a piezoelectric material, outputs voltage corresponding to the pressing force. The function of the force sensor 40 may be realized by the piezoelectric element 30 so that the force sensor 40 is omitted.

Although a display/operation surface of the touch panel 2 shown in the drawing has a rectangular shape, an arbitrary shape composed of curved lines and straight lines can be selected or a display/operation surface may be divided into plural sections.

Operation in the Embodiment

Operations of the input device 1 with large pressing force (1) and with small pressing force (2) will be separately described below in reference to FIGS. 1A to 3B.

(1) Operation with Large Pressing Force

Figure 2A:
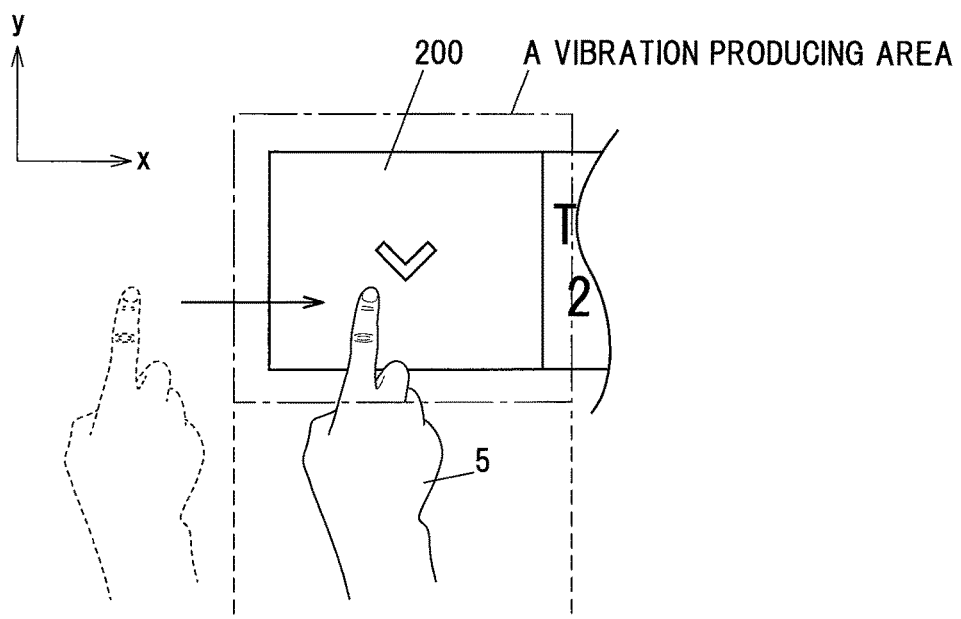
FIGS. 2A and 2B are explanatory graphical representations showing an example of an operation of the input device.
Figure 2B:
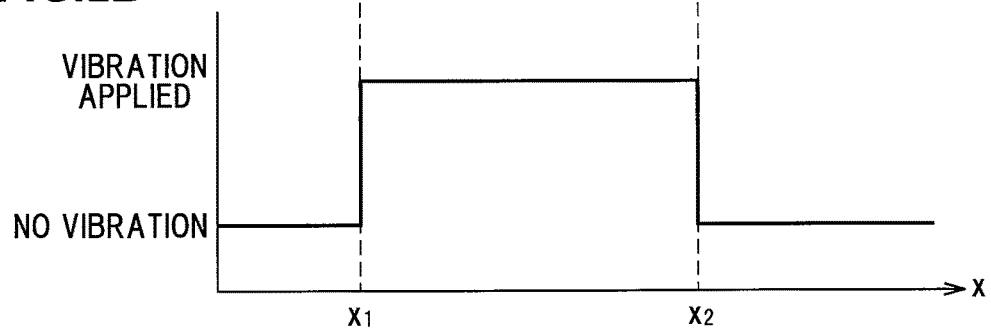

FIGS. 2A and 2B are explanatory graphical representations showing an example of an operation of the input device 1.

Here, the upward direction in FIG. 2A is defined as the y-axis direction and the rightward direction in the drawing is defined as the x-axis direction. Although an operation with respect to the button 200, among the buttons 200 to 203, will be representatively described below, the same applies to the other buttons 201 to 203.

An operation shown in FIG. 2A will be described as an example. A vibration producing area A of the button 200 is present in the region of $x_1 \leq x \leq x_2$ and the finger 5 of the user travels in the x-direction from the outside of the vibration producing area A ($x < x_1$) to the inside of the vibration producing area A ($x_1 \leq x \leq x_2$) while touching the operation surface of the touch panel 2.

As shown in FIG. 2B, the piezoelectric element 30 does not vibrate when the touch location 50 is located out of the area of the button 200 ($x < x_1$, $x_2 < x$), and vibrates when the touch location 50 is within the area of the button 200 ($x_1 \leq x \leq x_2$).

Figure 3A:
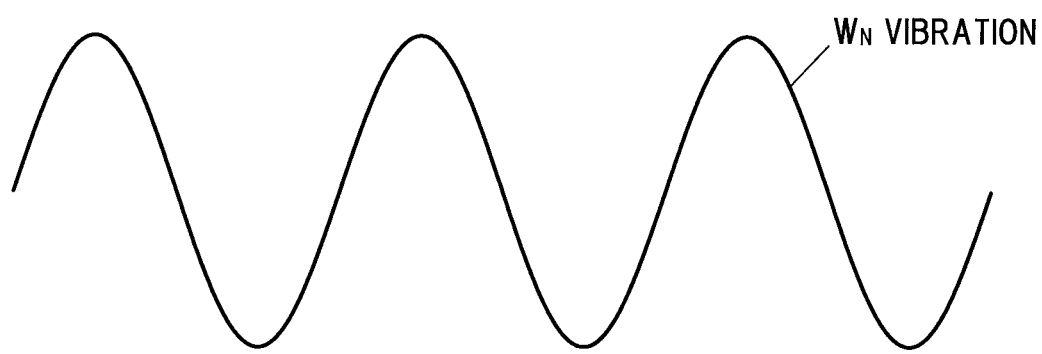
FIGS. 3A and 3B are schematic views showing example waveforms of vibration applied by a piezoelectric element 30.
Figure 3B:
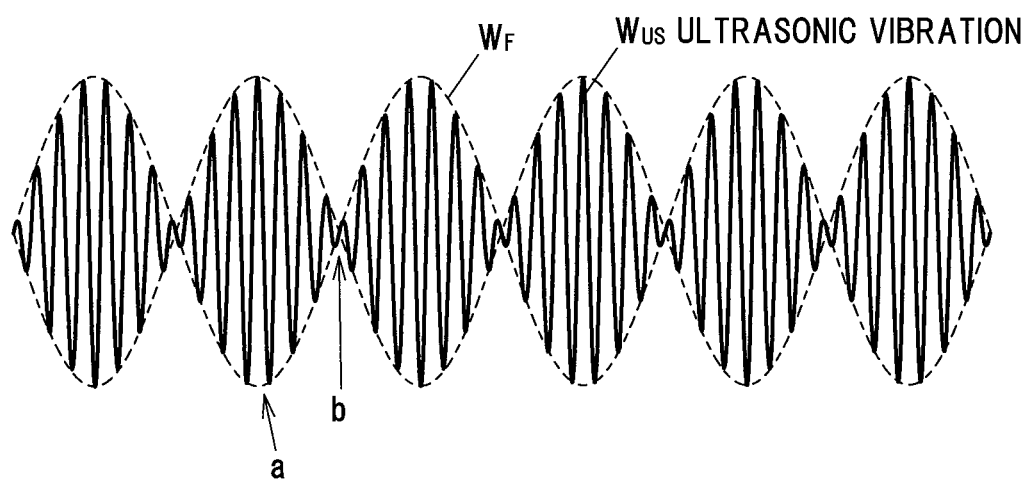

FIGS. 3A and 3B are schematic views showing example waveforms of vibration applied by the piezoelectric element 30.

As shown in FIG. 3A, when a pressing force F of the finger 5 of the user is not less than a predetermined pressing force $F_{TH}$, the piezoelectric element 30 vibrates at a frequency in a predetermined range, e.g., at a frequency of several tens to several hundreds of Hz (vibration $W_N$) based on the vibration control signal Sb input from the controller 3.

(2) Operation with Small Pressing Force

On the other hand, as shown in FIG. 3B, when the pressing force F of the finger 5 of the user is smaller than the predetermined pressing force $F_{TH}$, the piezoelectric element 30 vibrates with a waveform resulting from amplitude modulation of modulating vibration at a frequency in an ultrasonic range, e.g., at a frequency of several tens of kHz (ultrasonic vibration $W_{US}$) by a modulation wave ($W_F$) at a frequency in a predetermined range smaller than the ultrasonic range, e.g., at a frequency of several tens to several hundreds of Hz.

When the operation surface of the touch panel 2 is vibrated by the ultrasonic vibration $W_{US}$ generated by the piezoelectric element 30, friction resistance between the finger 5 of the user and the operation surface of the touch panel 2 is reduced due to a squeezing effect as compared to the case without vibration. This is because peripheral air (or liquid) is drawn into a space between the finger 5 and the operation surface due to pressure variation caused by the vibration.

The waveform shown in FIG. 3B is a result of using the squeezing effect, where the friction resistance between the finger 5 of the user and the operation surface of the touch panel 2 becomes low at phases-a as antinode portions of $W_F$ and the friction resistance between the finger 5 of the user and the operation surface of the touch panel 2 becomes high at phases-b as node portions of $W_F$. That is, the finger 5 of the user performing a tracing operation on the operation surface of the touch panel 2 feels periodically-varying friction and an operational feeling can be thus provided even when the pressing force F is smaller than $F_{TH}$.

Effects of the Embodiment

In the present embodiment, when the touch location 50 between the finger 5 of the user and the operation surface of the touch panel 2 is located within the vibration producing area A and at the same time the pressing force of the finger 5 of the user against the operation surface is smaller than the threshold $F_{TH}$, the piezoelectric element 30 vibrates according to the vibration control signal Sb from the controller 3 so as to have a waveform resulting from amplitude modulation of modulating vibration at a frequency of several tens of kHz by a modulation wave at a frequency of several tens to several hundreds of Hz. Therefore, the friction resistance between the finger 5 of the user and the operation surface of the touch panel 2 can be periodically changed by the squeezing effect and it is thus possible to present to the user that the button 200 to 203 is being manipulated even when the pressing force of the finger 5 of the user is small.

In addition, since the ultrasonic vibration $W_{US}$ which is out of the audible frequency of then user is used when the pressing force of the finger 5 of the user against the operation surface is small, generation of audible noise in association with vibration can be suppressed even when the amplitude of $W_F$ is increased.

Modifications

Although the typical configuration example of the input device 1 of the invention has been described above with the embodiment and illustrated example, the following modifications can be also implemented.

(1) The input device 1 can be used not only for in-vehicle devices but also for various electronic/electrical devices.

(2) The number, positions and arrangement configuration of the input devices 1 may be appropriately selected according to, e.g., the intended use, etc.

It should be noted that the invention is not intended to be limited to the embodiment and the various kinds of modifications can be implemented without departing from or adjusting the technical idea of the invention. For example, the vibration may continuously and gradually vary from the waveform shown in FIG. 3A to the waveform shown in FIG. 3B so as to be proportional to variation in the pressing force of the finger 5 in a negative direction.

What is claimed is:

1. An input device configured for controlling an in-vehicle device, where the in-vehicle device controls operations of the vehicle, comprising:
   a display mounted within a vehicle to display an operation object on a display screen;
   a touch sensor to output an operation signal based on a touch location on an operation surface corresponding to the display screen of the display;
   a force sensor to detect a pressing force applied by a user to the to the operation surface and output a detection signal;
   a vibrator having a transducer that converts an AC current into mechanical vibrations that vibrate the operation surface based on a vibration control signal; and
   a controller to receive the operation signal and output the vibration control signal such that the vibrator vibrates at a first non-ultrasonic frequency in a predetermined range when the touch location is within a region corresponding to the operation object on the display screen and when the pressing force detected is not less than a predetermined value,
   wherein the transducer of the vibrator vibrates only at an ultrasonic frequency when the pressing force detected is smaller than the predetermined value such that the vibrator generates no perceptible noise, the same transducer also vibrating such that the waveform of the ultrasonic output is amplitude modulated via a second non-ultrasonic frequency so as to periodically change a friction resistance between a finger of a user and the operation surface, the non-ultrasonic frequency being selected to be greater than 20 Hz and less than 1 KHz such that the user feels a periodically-varying friction.

2. The input device according to claim 1, wherein the vibrator stops vibrating when the touch location is out of the region corresponding to the operation object on the display screen.

3. The input device according to claim 1, wherein the vibrator is disposed at a center of the operation surface.

4. The input device according to claim 1, wherein the force sensor is disposed at a corner of operation surface.

5. The input device according to claim 1, wherein the vibrator is integrated with the force sensor.

6. The input device according to claim 1, wherein the waveform of the ultrasonic output is amplitude modulate via a second waveform having a uniform periodicity.

7. The input device according to claim 1, wherein the no n ultrasonic modulation frequency is greater than 100 Hz.

* * * * *